United States Patent
Dhingra et al.

(10) Patent No.: US 6,419,819 B1
(45) Date of Patent: *Jul. 16, 2002

(54) SYNTHETIC POROUS CRYSTALLINE MCM-67, ITS SYNTHESIS AND USE

(75) Inventors: Sandeep Singh Dhingra, Robbinsville, NJ (US); Charles T. Kresge, Midland, MI (US); Robin P. Ziebarth, Glen Gardner, NJ (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/689,280

(22) Filed: Oct. 12, 2000

Related U.S. Application Data

(63) Continuation-in-part of application No. 09/490,265, filed on Jan. 24, 2000, now abandoned, which is a continuation-in-part of application No. 09/223,657, filed on Dec. 30, 1998, now Pat. No. 6,063,262.

(51) Int. Cl.$^7$ .......................... C01B 39/46; C10G 11/04; C10G 11/05
(52) U.S. Cl. ...................... 208/113; 208/118; 208/119; 208/120.05; 208/120.35; 423/702; 423/705; 423/713; 423/718
(58) Field of Search ................ 423/702, 705, 423/709, 713, 718; 208/118, 119, 120, 113, 120.05, 120.35

(56) References Cited

U.S. PATENT DOCUMENTS

| 3,010,789 | A | * | 11/1961 | Milton |
| 3,247,195 | A | * | 4/1966 | Kerr |
| 4,556,549 | A | * | 12/1985 | Valyocsik |
| 4,857,288 | A | * | 8/1989 | Marcus et al. |
| 5,202,014 | A | * | 4/1993 | Zones et al. |
| 5,236,575 | A | * | 8/1993 | Bennett et al. |
| 5,266,541 | A | * | 11/1993 | Kresge et al. |
| 5,328,675 | A | * | 7/1994 | Vaughan et al. |
| 5,591,421 | A | * | 1/1997 | Zones |
| 6,049,018 | A | * | 4/2000 | Calabro et al. |
| 6,063,262 | A | * | 5/2000 | Dhingra et al. |

OTHER PUBLICATIONS

Freyhardt et al., "VPI-8: A High-Silica Molecular Sieve with a Novel "Pinwheel" Building Unit and its Implications for the Synthesis of Extra-Large Pore Molecular Sieves," J. Am. Chem. Soc., vol. 118(31), pp. 7299-7310, 1996.*

M. A. Camblor, M. Yoshikawa, S. I. Zones, M. E. Davis "Synthesis of VPI-8: The First Large Pore Zincosilicate" in Synthesis of Porous Materials: Zeolites, Clays and Nanostructures, edited M. L. Occelli and H. Kessler, Marcel Dekker Inc., New York, 1996, pp. 243-261.

M. Yoshikawa, S. I. Zones, M. E. Davis "Synthesis of VPI-8 I. The effects of Reaction Components", in Microporous Materials, 1997, 11, 127-136.

* cited by examiner

Primary Examiner—David Sample

(57) ABSTRACT

This invention relates to a new synthetic porous crystalline material, designated MCM-67, a method for its preparation and use thereof in catalytic conversion of organic compounds. MCM-67 appears to be closely related in structure to VPI-8 and SSZ-41 but is synthesized without zinc and in the presence of manganese and/or cobalt ions.

10 Claims, 6 Drawing Sheets

X-ray Powder Diffraction Pattern of As-Synthesized MCM-67

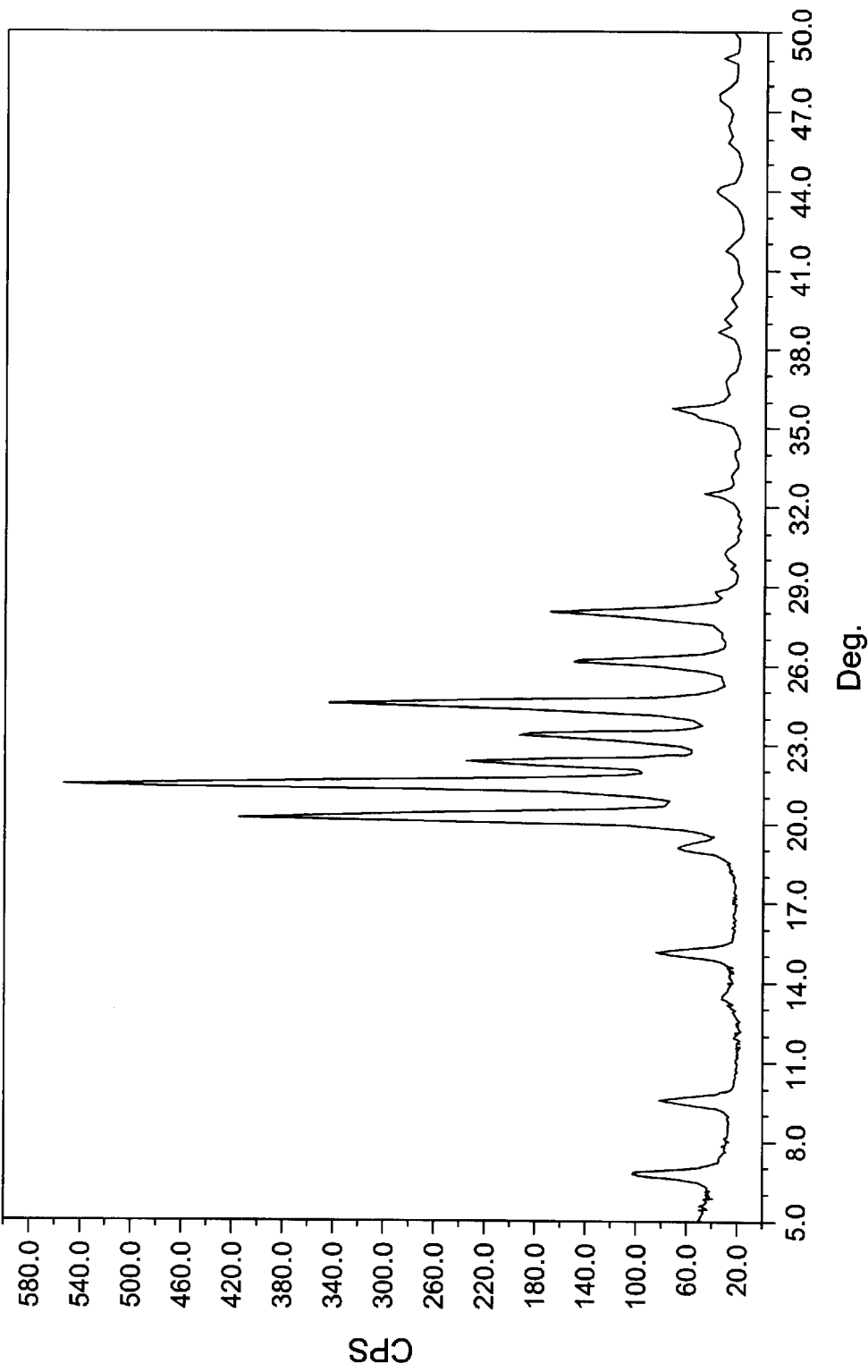

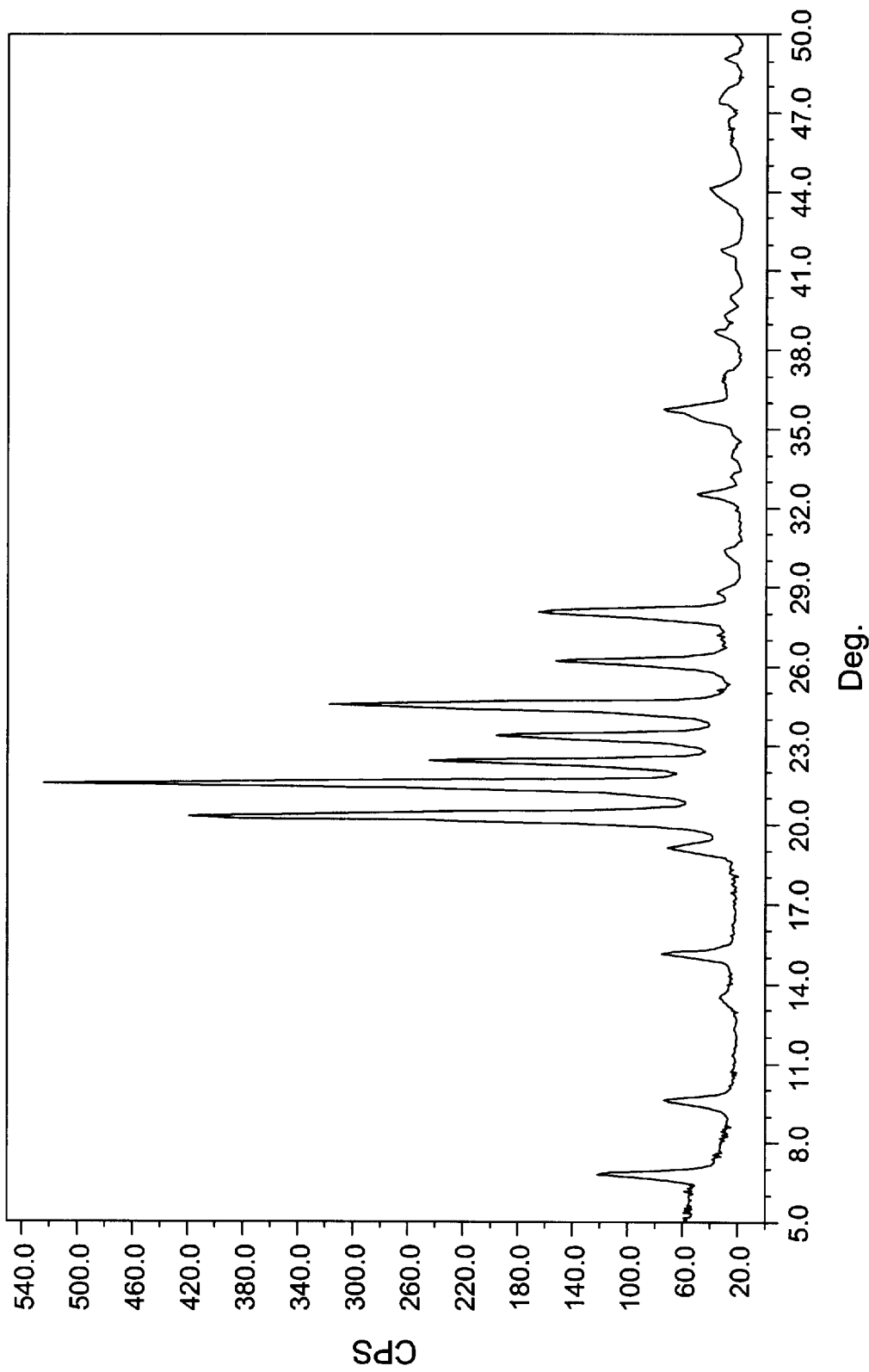
Fig. 2 X-ray Powder Diffraction Pattern of As-Synthesized MCM-67

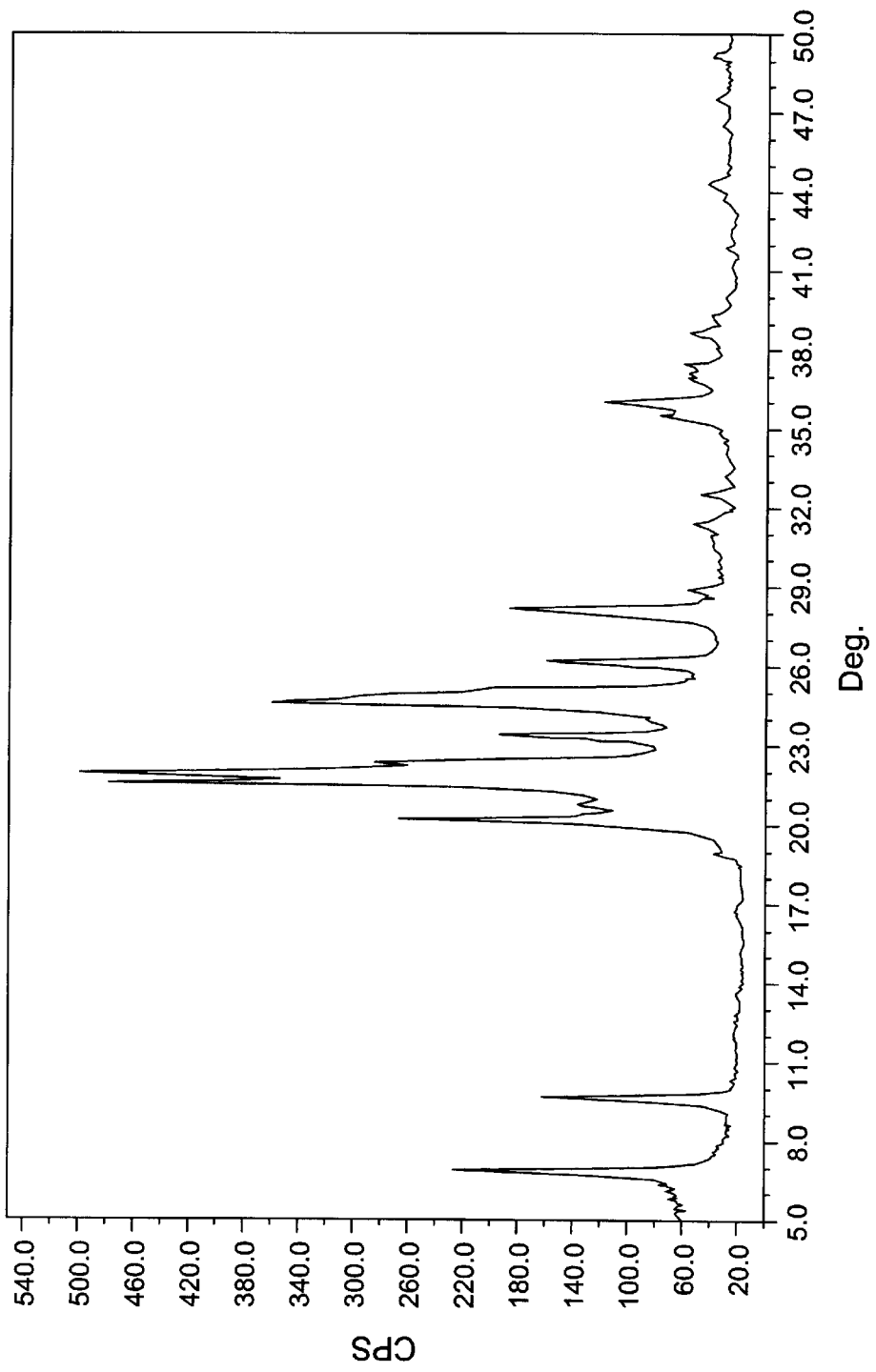
Fig. 3  X-ray Powder Diffraction Pattern of As-Synthesized MCM-67

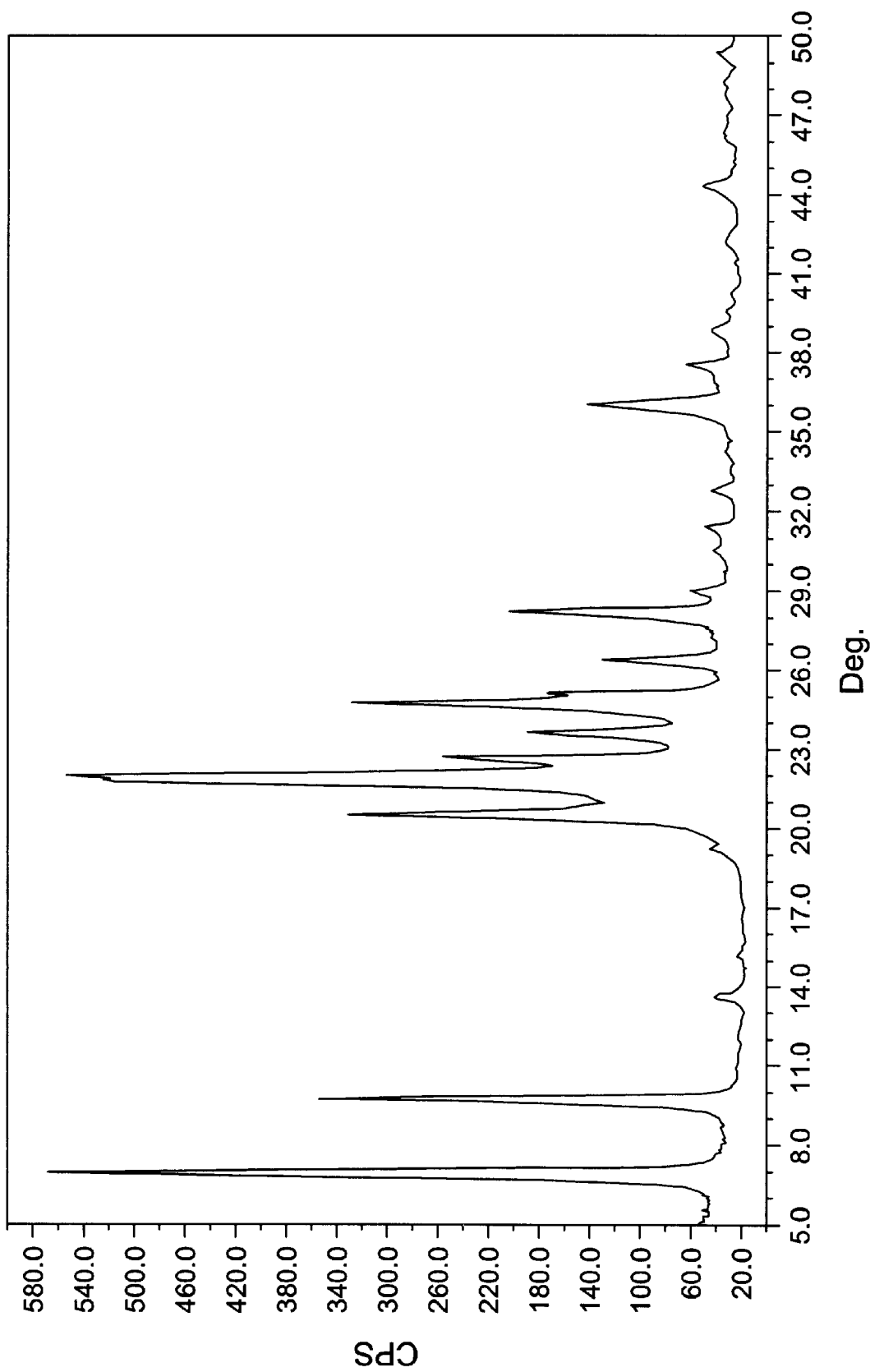

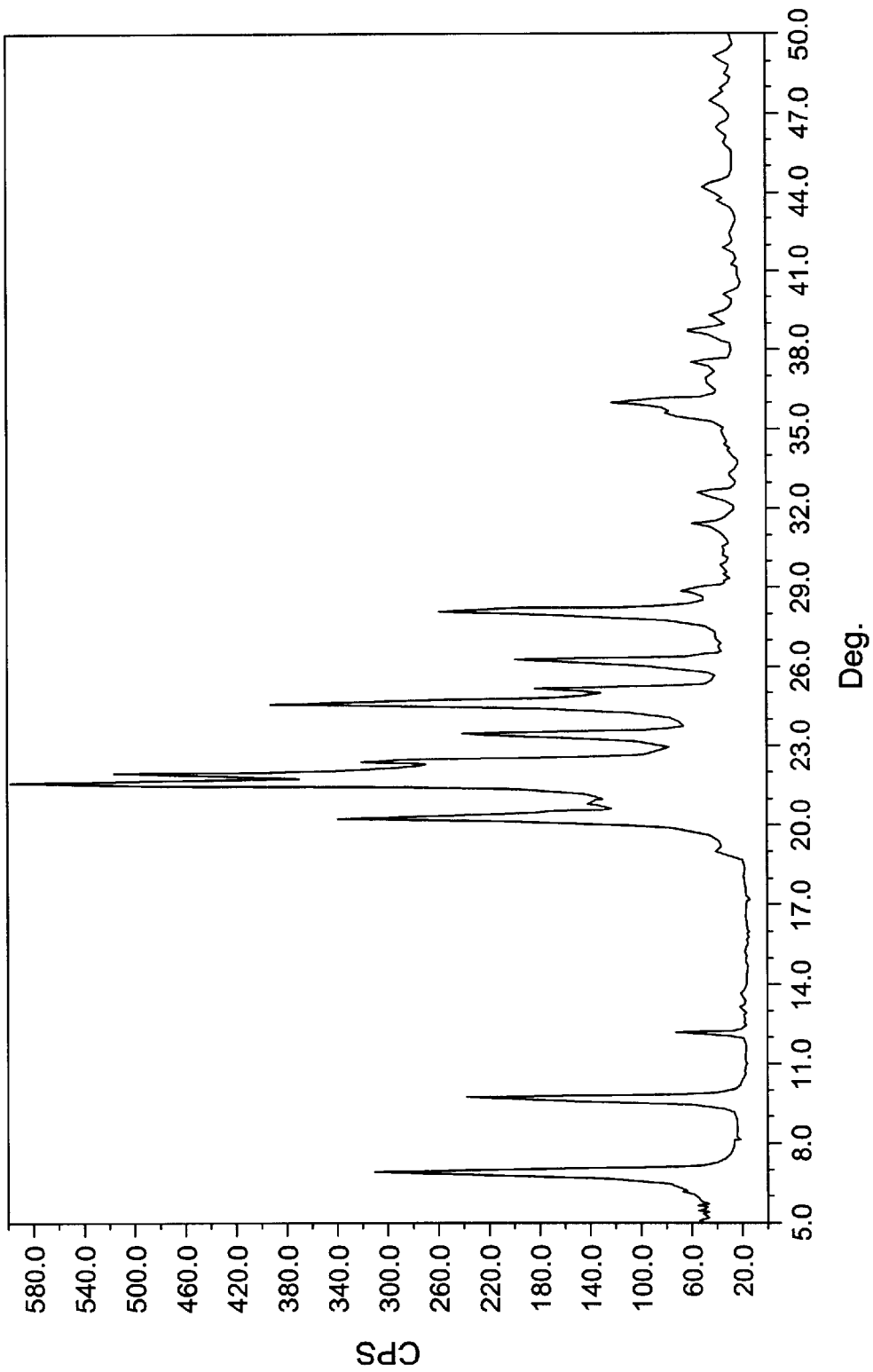
Fig. 5  X-ray Powder Diffraction Pattern of As-Synthesized MCM-67

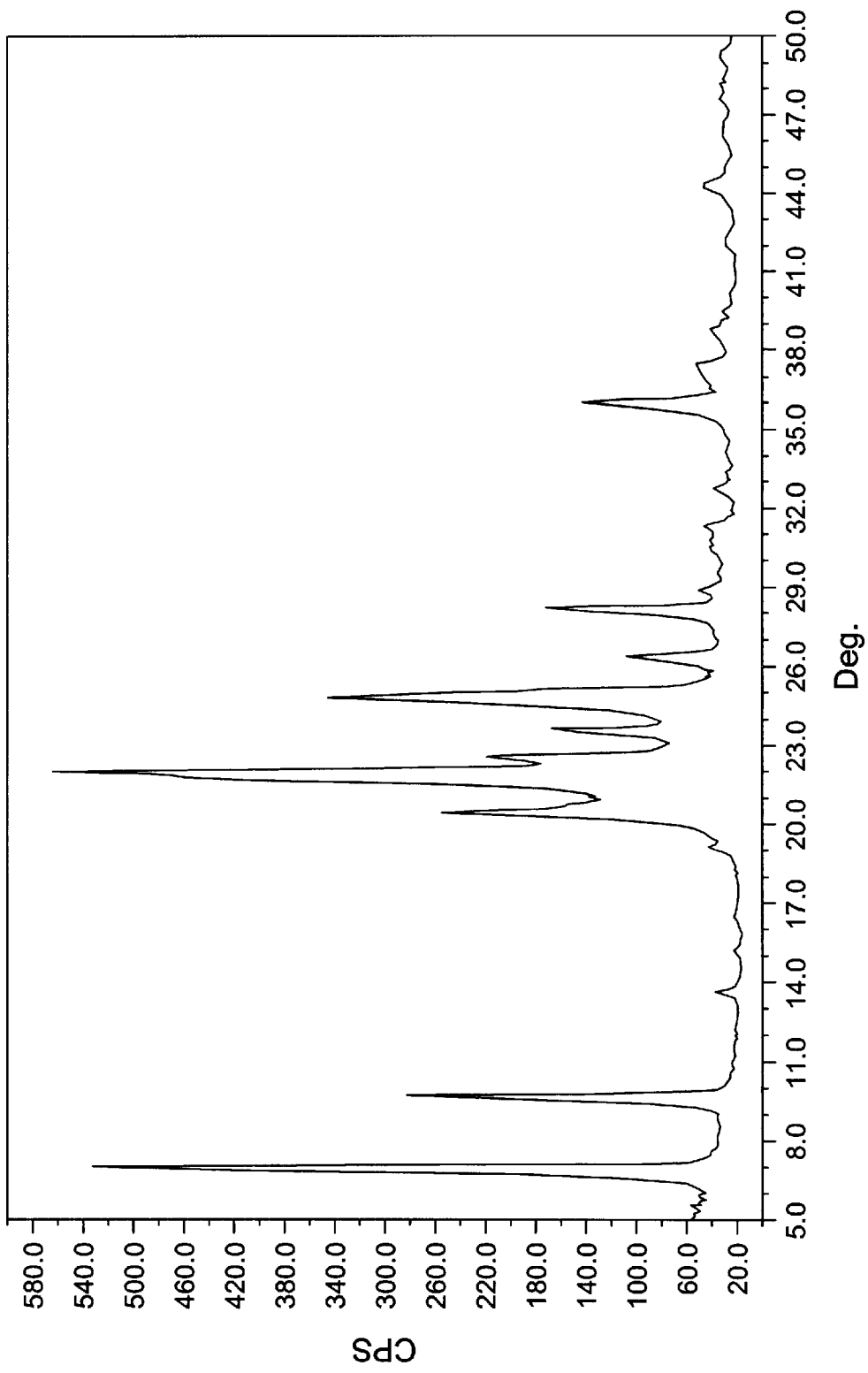
Fig. 6 X-ray Powder Diffraction Pattern of Calcined MCM-67

SYNTHETIC POROUS CRYSTALLINE MCM-67, ITS SYNTHESIS AND USE

Cross Reference to Related Applications

This application is a continuation-in-part of U.S. patent application Ser. No. 09/490,265 filed Jan. 24, 2000, now abandoned, which in turn is a continuation-in-part of U.S. patent application Ser. No. 09/223,657 filed Dec. 30, 1998 now U.S. Pat. No. 6,063,262.

BACKGROUND OF THE INVENTION

1. Field of the Invention

This invention relates to a novel synthetic porous crystalline material, MCM-67, to a method for its preparation and to its use in catalytic conversion of organic compounds.

2. Description of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIA element oxide, e.g., $AlO_4$, in which the tetrahedra are cross-linked by the sharing of oxygen atoms whereby the ratio of the total Group IIIA element, e.g., aluminum, and silicon atoms to oxygen atoms is 1:2. The electrovalence of the tetrahedra containing the Group IIIA element, e.g., aluminum, is balanced by the inclusion in the crystal of a cation, for example an alkali metal or an alkaline earth metal cation. This can be expressed wherein the ratio of the Group IIIA element, e.g., aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882, 243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709, 979); zeolite ZSM-12 (U.S. Pat. No. 3,832,449), zeolite ZSM-20 (U.S. Pat. No. 3,972,983); ZSM-35 (U.S. Pat. No. 4,016,245); zeolite ZSM-23 (U.S. Pat. No. 4,076,842); zeolite MCM-22 (U.S. Pat. No. 4,954,325); and zeolite MCM-35 (U.S. Pat. No. 4,981,663), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (Re. 29,948) discloses a porous crystalline silicate made from a reaction mixture containing no deliberately added alumina in the starting mixture and exhibiting the X-ray diffraction pattern characteristic of ZSM-5. U.S. Pat. Nos. 4,061,724, 4,073,865 and 4,104,294 describe crystalline silicates of varying alumina and metal content.

One known zeolite is VPI-8 which is described by M. A. Camblor, M. Yoshikawa, S. I. Zones, M. E. Davis "Synthesis of VPI-8: The first Large Pore Zincosilicate," in Synthesis of Porous Materials: Zeolites, Clays and Nanostructures, edited M. L. Occelli and H. Kessler, Marcel Dekker Inc., New York, 1996, p 243–261; and by M. Yoshikawa, S. I. Zones, M. E. Davis "Synthesis of VPI-8 I. The effects of Reaction Components", in Microporous Materials, 1997, 11, 127–136. VPI-8 is isostructural with SSZ-41 which is described in U.S. Pat. No. 5,591,421. Both VPI-8 and SSZ-41 necessarily require the presence of zinc.

MCM-67 of the present invention appears to be closely related in structure to VPI-8 and SSZ-41 but is synthesized in the absence of zinc. MCM-67 is synthesized in the presence of manganese and/or cobalt ions and can be synthesized as a boro-metallosilicate or as a copper silicate.

SUMMARY OF THE INVENTION

The present invention is directed to a novel porous crystalline material, named MCM-67, which in its calcined form is characterized by an X-ray diffraction pattern including values substantially as set forth in Table I of the specification and has a composition comprising the molar relationship

$YO_2:(n)X_2O_3:(p)ZO$ wherein X is a trivalent element, Y is a tetravalent element and Z is cobalt and/or manganese, n is from 0 to 0.5, and p is from 0.0001 to 0.5 and wherein the porous crystalline material does not contain zinc.

The invention further resides in a method for the preparation of MCM-67, and the conversion of organic compounds contacted with an active form thereof

DESCRIPTION OF DRAWINGS

FIG. 1 shows the X-ray diffraction pattern of the as-synthesized product of Example 1.

FIG. 2 shows the X-ray diffraction pattern of the as-synthesized product of Example 2.

FIGS. 3 and 4 show the X-ray diffraction patterns of the as-synthesized and as-calcined products respectively of Example 3.

FIGS. 5 and 6 show the X-ray diffraction patterns of the as-synthesized and as-calcined products respectively of Example 4.

DESCRIPTION OF SPECIFIC EMBODIMENTS

The crystalline material of this invention, MCM-67, is a single crystalline phase which can be prepared in essentially pure form with little or no detectable impurity crystal phases and, in its calcined form, has an X-ray diffraction pattern which is characterized by the lines listed in Table 1 below:

TABLE 1

| d(Å) | Relative Intensity [100 × I/(o)] |
|---|---|
| 12.95 +/− 0.20 | VS |
| 9.17 +/− 0.20 | M-S |
| 4.41 +/− 0.10 | VS |
| 4.12 +/− 0.10 | VS |
| 3.97 +/− 0.10 | M |
| 3.80 +/− 0.10 | M |
| 3.61 +/− 0.10 | M |
| 3.39 +/− 0.10 | M |
| 3.16 +/− 0.10 | M |
| 2.51 +/− 0.10 | W |

In its as-synthesized form, the crystalline MCM-67 material of the invention has an X-ray diffraction pattern which is characterized by the lines listed in Table 2 below:

TABLE 2

| d(Å) | Relative Intensity [100 × I/(o)] |
|---|---|
| 13.16 +/− 0.20 | S |
| 9.28 +/− 0.20 | W |
| 4.44 +/− 0.10 | VS |
| 4.15 +/− 0.10 | VS |
| 4.00 +/− 0.10 | S-VS |
| 3.83 +/− 0.10 | S |
| 3.64 +/− 0.10 | S-VS |
| 3.42 +/− 0.10 | M-S |
| 3.18 +/− 0.10 | M |
| 2.53 +/− 0.10 | M |

These X-ray diffraction data were collected with a Scintag diffraction system, equipped with a germanium solid state detector, using copper K-alpha radiation. The diffraction data were recorded by step-scanning at 0.02 degrees of two-theta, where theta is the Bragg angle, and a counting time of 10 seconds for each step. The interplanar spacings, d's, were calculated in Angstrom units (A), and the relative intensities of the lines, $I/I_0$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (80–100), s=strong (60–80), m=medium (40–60), w=weak (20–40), and vw=very weak (0–20). It should be understood that diffraction data listed for this sample as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, and thermal and/or hydrothermal history.

The crystalline material of this invention has a composition involving the molar relationship:

$$YO_2:(n)X_2O_3:(p)ZO,$$

wherein X is a trivalent element, such as aluminum, boron, iron, indium, and/or gallium, preferably aluminum; Y is a tetravalent element such as silicon, tin, and/or germanium, preferably silicon; and Z is cobalt and/or manganese, n is from 0 to 0.5 and p is from to 0.0001 to 0.5 and wherein the porous crystalline material does not contain zinc.

In the as-synthesized form, the material has a formula, on an anhydrous basis and in terms of moles of oxides per n moles of $YO_2$, as follows:

$$(0.1-2)M_2O:(0.2-2)R: YO_2:(n)X_2O_3:(p)ZO,$$

wherein M is an alkali or alkaline earth metal, and R is an organic moiety. The M and R components are associated with the material as a result of their presence during crystallization, and are easily removed by post-crystallization methods hereinafter more particularly described.

The crystalline material of the invention is thermally stable up to at least 540° C. in air and in the calcined form exhibits a surface area of 130 to 180 m²/g and a micropore volume of 0.033 to 0.099 cc/gm To the extent desired, the original sodium and/or potassium cations of the as-synthesized material can be replaced in accordance with techniques well known in the art, at least in part, by ion exchange with other cations. Preferred replacing cations include metal ions, hydrogen ions, hydrogen precursor, e.g., ammonium, ions and mixtures thereof. Particularly preferred cations are those which tailor the catalytic activity for certain hydrocarbon conversion reactions. These include hydrogen, rare earth metals and metals of Groups IIA, IIIA, IVA, IB, IIB, IIIB, IVB and VII of the Periodic Table of the Elements.

When used as a catalyst, the crystalline material of the invention may be subjected to treatment to remove part or all of any organic constituent. The crystalline material can also be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be in the composition by way of cocrystallization, exchanged into the composition to the extent a Group IIIA element, e.g., aluminum, is in the structure, impregnated therein or intimately physically admixed therewith. Such component can be impregnated in or on to it such as, for example, by, in the case of platinum, treating the silicate with a solution containing a platinum metal-containing ion. Thus, suitable platinum compounds for this purpose include chloroplatinic acid, platinous chloride and various compounds containing the platinum amine complex.

The above crystalline MCM-67 material can be transformed by thermal treatment. This thermal treatment is generally performed by heating at a temperature of at least about 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C. The thermally treated product, especially in its metal, hydrogen and ammonium forms, is particularly useful in the catalysis of certain organic, e.g., hydrocarbon, conversion reactions.

The crystalline material of this invention, when employed either as an adsorbent or as a catalyst in an organic compound conversion process should be dehydrated, at least partially. This can be done by heating to a temperature in the range of 200° C. to about 370° C. in an atmosphere such as air, nitrogen, etc., and at atmospheric, subatmospheric or superatmospheric pressures for between 30 minutes and 48 hours. Dehydration can also be performed at room temperature merely by placing the MCM-67 in a vacuum, but a longer time is required to obtain a sufficient amount of dehydration.

The present crystalline material can be prepared from a reaction mixture containing sources of alkali or alkaline earth metal (M), preferably lithium, cation, optionally an oxide of trivalent element X, e.g., aluminum and/or boron, an oxide of tetravalent element Y, e.g., silicon, an oxide of cobalt and/or manganese (Z), directing agent (R), and water, said reaction mixture having a composition, in terms of mole ratios of oxides, within the following ranges:

| Reactants | Useful | Preferred |
|---|---|---|
| $YO_2/ZO$ | 1–10,000 | 5–200 |
| $YO_2/X_2O_3$ | >1 | 5–100 |
| $H_2O/YO_2$ | 10–1,000 | 25–100 |
| $OH/YO_2$ | 0.05–1 | 0.05–0.5 |
| $M/YO_2$ | 0.05–2 | 0.05–0.5 |
| $R/YO_2$ | 0.05–2 | 0.05–0.4 |

The organic directing agent R used herein is either tetraethylammonium cation or bis(cyclopentadienyl) cobalt(III) cation, $(C_5H_5)_2Co^+$. The source of this organic cation may be, for example, the halide or hydroxide salt.

Crystallization of MCM-67 can be carried out at either static or stirred conditions in a suitable reactor vessel, such as for example, polypropylene jars or teflon lined or stainless steel autoclaves, at a temperature of 80° C. to about 250° C. for a time sufficient for crystallization to occur at the temperature used, e.g., from about 12 hours to about 100 days. Thereafter, the crystals are separated from the liquid and recovered.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

Synthesis of the new crystals may be facilitated by the presence of at least 0.01 percent, preferably 0.10 percent and still more preferably 1 percent, seed crystals (based on total weight) of crystalline product.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The crystalline material of this invention can be used to catalyze a wide variety of chemical conversion processes including many of present commercial/industrial importance. Examples of chemical conversion processes which are effectively catalyzed by the crystalline material of this invention, by itself or in combination with one or more other catalytically active substances including other crystalline catalysts, include those requiring a catalyst with acid activity. Specific examples include hydrocarbon conversion reactions such as catalytic cracking. In addition, the presence of cobalt and/or manganese in MCM-67 mean that the material is potentially useful in catalytic oxidation and desulfurization.

As in the case of many catalysts, it may be desired to incorporate MCM-67 with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction MCM-67, i.e., combined therewith or present during synthesis, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, such as silica, zirconia, titania, magnesia, beryllia, alumina, and mixtures thereof.

In addition to the foregoing materials, the new crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following examples are presented.

Example 1

1.22 g of colloidal silica (Ludox HS-40), $LiOH.H_2O$ (lithium hydroxide monohydrate), an aqueous solution of $(C_5H_5)_2CoOH$ (bis(cyclopentadienyl)cobalt(III) hydroxide), and distilled water were combined to produce a mixture with the following ratios:

| | |
|---|---|
| Na/Si | ~0.02 |
| $(C_5H_5)_2Co^+/Si$ | ~0.10 |
| Li/Si | ~0.15 |
| $H_2O/Si$ | ~50 |

The combined mixture was sealed in a PFA tube, sealed in an autoclave partially filled with water and heated at 175° C. for 100 hours. The product was filtered, washed with water, then air-dried. The x-ray diffraction of pattern of the as-synthesized material is shown in FIG. 1.

Example 2

1.22 g of colloidal silica (Ludox HS-40), LiOH.H$_2$O (lithium hydroxide monohydrate), an aqueous solution of (C$_5$H$_5$)$_2$CoOH (bis(cyclopentadienyl)cobalt(III) hydroxide), H$_3$BO$_3$ (boric acid), and distilled water were combined to produce a mixture with the following ratios:

| | |
|---|---|
| Na/Si | ~0.02 |
| (C$_5$H$_5$)$_2$Co$^+$/Si | ~0.10 |
| Li/Si | ~0.15 |
| B/Si | ~0.05 |
| H$_2$O/Si | ~50 |

The combined mixture was sealed in a PFA tube, sealed in an autoclave partially filled with water and heated at 175° C. for 100 hours. The product was filtered, washed with water, then air-dried. The x-ray diffraction of pattern of the as-synthesized material is shown in FIG. 2.

Example 3

7 g of Colloidal Silica (30 wt. %), CoCl$_2$.4H$_2$O (cobalt chloride tetrahydrate), LiOH (lithium hydroxide 10 wt. % solution), TEAOH (tetraethyl ammonium hydroxide 35 wt. % solution), and distilled water were combined in the following ratio:

| | |
|---|---|
| Si/M | ~50 |
| H$_2$O/Si | ~30 |
| OH$^-$/Si | ~0.40 |
| Li$^+$/Si | ~0.20 |
| TEAOH/Si | ~0.20 |

The combined mixture was added to an autoclave and heated to 180° C. for 150 hours. The product was then filtered and washed with water. The as-synthesized material is calcined at a temperature of 540° C. to yield the new material designated as MCM-67. The powder x-ray diffraction patterns of the as-synthesized and calcined materials are given in FIGS. 3 and 4, respectively.

Example 4

7 g of Colloidal Silica (30 wt. %), MnCl$_2$.4H$_2$O (manganese chloride tetrahydrate), LiOH (lithium hydroxide 10 wt. % solution), TEAOH (tetraethyl ammonium hydroxide 35 wt. % solution), and distilled water were combined in the following ratio:

| | |
|---|---|
| Si/M | ~50 |
| H$_2$O/Si | ~30 |
| OH$^-$/Si | ~0.40 |
| Li$^+$/Si | ~0.20 |
| TEAOH/Si | ~0.20 |

The combined mixture was added to an autoclave and heated to 180° C. for 150 hours. The product was then filtered and washed with water. The as-synthesized material is calcined at a temperature of 540° C. to yield the new material designated as MCM-67. The powder x-ray diffraction patterns of the as-synthesized and calcined materials are given in FIGS. 5 and 6, respectively.

What is claimed is:

1. A synthetic porous crystalline material which in its calcined form is characterized by an X-ray diffraction pattern including lines having d-spacing and relative intensity values substantially as set forth in Table 1 of the specification and has a composition comprising the molar relationship $$YO_2:(n)X_2O_3:(p)ZO$$

wherein X is a trivalent element, Y is a tetravalent element and Z is cobalt and/or manganese, n is from 0 to 0.5 and p is from 0.0001 to 0.5 and wherein the porous crystalline material does not contain zinc.

2. The crystalline material of claim 1 having a composition, on an anhydrous basis and in terms of moles of oxides per n moles of YO$_2$, expressed by the formula:

$$(0.1-2)M_2O:(0.2-2)R:YO_2: (n)X_2O_3:(p)ZO,$$

wherein M is alkali or alkaline earth metal and R is an organic moiety.

3. The crystalline material of claim 2 wherein said R comprises a tetraethylammonium cation or a bis (cyclopentadienyl) cobalt(III) cation.

4. The crystalline material of claim 1 wherein X is a trivalent element selected from the group consisting of boron, iron, indium, gallium, aluminum, and a combination thereof; and Y is a tetravalent element selected from the group consisting of silicon, tin, germanium, and a combination thereof.

5. The crystalline material of claim 1 wherein Y comprises silicon.

6. A method for synthesizing crystalline material exhibiting a characteristic X-ray diffraction pattern including lines having d-spacing and relative intensity values shown in Table 1 which comprises (i) preparing a mixture capable of forming said material, said mixture comprising sources of alkali or alkaline earth metal (M), an oxide of trivalent element (X), an oxide of tetravalent element (Y), an oxide of cobalt or manganese (Z), water, and directing agent (R) comprising a tetraethylammonium cation or a bis (cyclopentadienyl) cobalt(III) cation, and having a composition, in terms of mole ratios, within the following ranges:

| | |
|---|---|
| YO$_2$/ZO | 1–10,000 |
| YO$_2$/X$_2$O$_3$ | >1 |
| H$_2$O/YO$_2$ | 10–1,000 |
| OH/YO$_2$ | 0.05–1 |
| M/YO$_2$ | 0.05–2 |
| R/YO$_2$ | 0.05–2 |

(ii) maintaining said mixture under sufficient conditions including a temperature of from about 80° C. to about 250° C. until crystals of said material are formed; and (iii) recovering said crystalline material from step (ii).

7. The method of claim 6 wherein said mixture has the following composition ranges:

| | |
|---|---|
| $YO_2/ZO$ | 5–200 |
| $YO_2/X_2O_3$ | 5–100 |
| $H_2O/YO_2$ | 25–100 |
| $OH^-/YO_2$ | 0.05–0.5 |
| $M/YO_2$ | 0.05–0.5 |
| $R/YO_2$ | 0.05–0.4. |

8. The method of claim 6 wherein said mixture further comprises seed crystals in sufficient amount to enhance synthesis of said crystalline material.

9. The method of claim 6 wherein M comprises lithium.

10. A process for converting a feedstock comprising organic compounds to conversion product which comprises contacting said feedstock at organic compound conversion conditions with a catalyst comprising an active form of the synthetic porous crystalline material of claim 1.

* * * * *